Figure 1:
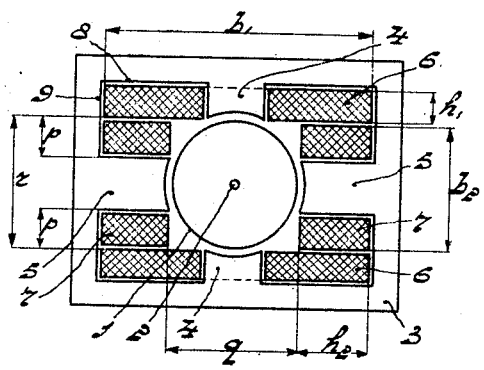

INVENTOR
DIRK ARIE VAN DEN BERG
AGENT

Patented Feb. 7, 1950

2,496,831

UNITED STATES PATENT OFFICE 2,496,831

DYNAMOELECTRIC MACHINE STATOR

Dirk Arie van den Berg, Eindhoven, Netherlands, assignor to Hartford National Bank and Trust Company, Hartford, Conn., as trustee Application July 20, 1946, Serial No. 685,149
In the Netherlands December 20, 1943

Section 1, Public Law 690, August 8, 1946
Patent expires December 20, 1963

4 Claims. (Cl. 171—252)

This invention relates to four-polar electric apparatus of low power (up to about 20 watts) comprising a stator, whose magnetic circuit is built up from identical iron sheets which are each integral with their poles of invariable section on which are arranged coils of, say, identical copper section, a rotor being adapted to rotate between said poles. One property of small apparatus of such type consists in that the quantity of copper required for the coils is large compared with larger apparatus, because the air gap between rotor and stator which, for reasons of manufacture, is disproportionately large, requires a comparatively large quantity of amp. windings. Such apparatus comprising a stator circuit having iron sheets of square shape are known and have the advantage that the sheets can quite readily be manufactured and built together to form the magnetic circut and the coils may be slipped on to the cores as former coils.

The invention has for its object to provide apparatus of the said type, whose space available for housing the stator coils, is utilized more efficiently than has hitherto been the case with former coils or in other words the invention aims at increasing the so-called filling factor of the coil space. In the said constructions this factor is not a maximum, there being non completely filled spaces between the angles of the magnetic circuit and the external sides of the coils, when these are slipped on to the poles.

The invention is based on recognition of the fact that an improvement is possible by the shape and the size of the coils in connection with the shape and the size of the poles.

For this purpose the apparatus according to the invention has a stator circuit of rectangular shape known so that one of the sets of pole shoes is longer than the other. In conjunction and so as to accord therewith in one of the sets of coils the ratio between the height and the width, the latter being measured parallel to the cross-section of the poles and in a plane parallel to the plane of the stator sheets, is so many times lower than the corresponding ratio with the other set of coils that the space available for all the coils is filled up as far as possible, after first the first-mentioned set is slipped from within on to the associated poles of the smaller length and then the other set on to the associated poles of the greater length.

In the use of cylindrical coils the said width is understood to mean the diameter of the coil. In these cases the filling factor will relatively be a maximum. Taken in an absolute sense, this factor is a maximum if use is made of coils having a rectangular or square cross section, one of the sides of which is parallel to the plane of the sheets. In the apparatus according to the invention use is therefore preferably made of such coils on account of their very high filling factor.

As compared with apparatus comprising square stator sheets, the apparatus according to the invention has the feature that for like power the total volume is smaller, since a large part of the clearance may be replaced by copper or iron respectively. Though in this case the axial length of the stator is increased by the size of one of the sets of coils on the short poles, this practically exercises but little influence on the total length of the apparatus, because a bearing or a collector with brushes may be housed with advantage in the space between the heads of the said coils projecting from the rotor.

By using the basic idea of the invention it is possible, broadly speaking, to use one set of such flat and wide coils that they may first be slipped on to the corresponding short pole shoes without being interferred with by the longer pole shoes. The dimensions of the widths of these coils in a plane parallel to the plane of the stator sheets are chosen to be so large in this case that the coil links up with the magnetic circuit of the stator as closely as possible. In this case, the other set of coils may be constructed as high, thinner coils, which are such that, in connection with the height of the first-mentioned set, after these have been arranged, may be slipped on to the longer associated poles, whilst their external side may link up as closely as possible with the head surfaces of the first set of coils.

In order that the invention may be clearly understood and readily carried into effect, it will now be explained more fully with reference to the accompanying drawing, in which the figures represent diagrammatically, by way of example, one form of construtcion of a stator circuit of apparatus according to the invention.

Figure 2:
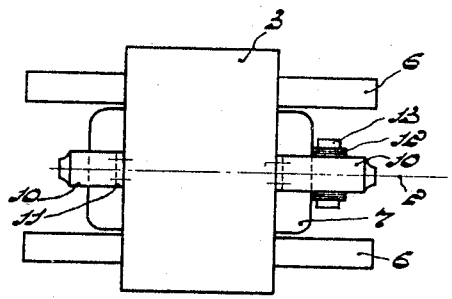

Fig. 1 is a cross-sectional view of the stator circuit taken normally to the rotor shaft so that the plane of the drawing coincides with one of the stator sheets. Fig. 2 is a side view thereof.

The rotor is designated 1 and the rotor shaft 2. A stator sheet 3 of rectangular shape which is similar to all the other sheets of the circuit, is made integral with the poles 4 and 5, for example, by punching. The poles of variable cross-section, which are here assumed to be equivalent have arranged on them former coils 6 and 7 of rectangular or square cross-section and identical copper section. To this end, the coils 6 are first slipped on to the shorter poles 4 and then the coils 7 on to the longer poles 5. The figure shows that a very high filling factor is thus obtainable, since hardly any clearance is left between the sides 8 and 9 of the stator sheets and the coil windings. This result has been rendered possible by dimensions of the coils and poles that are altered to accord with each other. For this purpose the width $b_1$ of the coils 6 should be such that the outside, measured along the height, links up with the stator circuit as closely as possible. The height $h_1$ should at the most be equal to and practically slightly smaller than the distance $p$ between the poles 5 and the line that extends in parallel therewith across the end of the poles 4. Only in this manner it is possible to slip the coils 6 on to the poles 4 without being interfered with by the poles 5.

The height $h_2$ of the coils 7 should at the most be equal to the distance $q$ and the width $b_2$ equal to the distance $r$. It is thus possible for these coils, after the coils 6 have been slipped on to the poles 4, to be housed one by one in the space destined for the rotor and to be slipped successively on to the poles 5.

It is obvious from the figure that, broadly speaking, the object aimed at is obtainable, the ratio $h_1/b_1$ of the coils 6 being chosen to be adequately smaller than the ratio $h_2/b_2$ of the coils 7. Though as a matter of course the size of the poles varies therewith, it is not necessary that all the poles should be identical. It is also possible that a set of associated poles are constructed as auxiliary poles of smaller size. In this case, the coils of the associated pair of coils need not have either the same copper section as the coils of the other pair.

By the use of a flat, low and a thinner, high coil, some clearance is set up in the direction of the axis, as may be seen from the side view of Fig. 2. This space may be utilized in an excellent way for housing the bearings and the bearing supports and, as the case may be, the collector with the brushes. Referring to Fig. 2, 10 designates the bearing supports which are fastened to the stator body by means of flanges 11. The collector is designated 12 and the brushes 13. The space between the projecting coils 6 is thus filled to a greater or less extent.

It is obvious that the apparatus according to the invention may be either a motor or a generator.

What I claim is:

1. Four-pole dynamoelectric apparatus, comprising a stator, a first pair of substantially identical rectangular field coils, a second pair of substantially identical rectangular field coils, a rotor and a shaft for said rotor, bearings for the said shaft, supports for said bearings, a collector, brushes for said collector, said stator being so built-up from substantially identical iron sheets and comprising a first set of substantially identical integral poles and a second set of substantially identical integral poles, said first set of poles being shorter than the said second set of poles, all of said poles being of substantially the same cross-section, the said first pair of field coils being of greater width than the said second set of coils and being so positioned on the said first set of poles as to axially overlap the said bearing, the said bearing supports, said collector and said brushes, the said second set of field coils being positioned on the said second set of poles, the coils of the said first set of poles being normal to the coils on the said second set of poles, the longer coils being slipped from within over the shorter poles to the said position and the shorter coils thereafter being slipped over the longer poles into the said normal position.

2. Dynamoelectric apparatus comprising a stator member built up from substantially identical iron sheets and having an internal cavity of substantially rectangular shape, a first pair of substantially identical pole members integral with and inwardly extending a predetermined height from two opposite sides of said cavity, a second pair of substantially identical pole members integral with and inwardly extending from the remaining two opposite sides of said cavity and each having a height less than one-third the distance between said latter opposite sides and having their top surfaces spaced apart a first given distance, the top surface of said first pole members being spaced a second given distance from the projection of the adjacent wall surface of said second pair of pole members, a first pair of coils positioned on said first pair of poles and having a width substantially equal to the distance between the said remaining two sides of said cavity and having a height less than said second given distance, and a second pair of coils positioned on said second pair of poles and having a width less than the distance between the top surfaces of said first pair of poles and having a height less than said first given distance.

3. Dynamoelectric apparatus comprising a stator member built up from substantially identical iron sheets and having an internal cavity of substantially rectangular shape, a first pair of substantially identical pole members integral with and inwardly extending a predetermined height from two opposite sides of said cavity, a second pair of substantially identical pole members integral with and inwardly extending from the remaining two opposite sides of said cavity and each having a height less than one-third the distance between said latter opposite sides and having their top surfaces spaced apart a first given distance, said first pair of poles being shorter than said second pair of poles and all of said poles having substantially the same cross section, the top surface of said first pole members being spaced a second given distance from the projection of the wall surface of said second pair of pole members, a first pair of coils positioned on said first pair of poles and having a width substantially equal to the distance between the said remaining two sides of said cavity and having a height less than said second given distance, and a second pair of coils having a copper cross section the same as said first pair of coils, said second pair of coils being positioned on said second pair of poles and having a width less than the distance between the top surfaces of said first pair of poles and having a height less than said first given distance.

4. Dynamoelectric apparatus comprising a stator member built up from substantially identical iron sheets and having an internal cavity of substantially rectangular shape, a first pair of substantially identical pole members integral with and inwardly extending a predetermined height from two opposite sides of said cavity, a second pair of substantially identical pole members integral with and inwardly extending from the remaining two opposite sides of said cavity and each having a height less than one-third the distance between said latter opposite sides and having their top surfaces spaced apart a first given distance, said first pair of poles being shorter than said second pair of poles and all of said poles having substantially the same cross section, the top surface of said first pole members being spaced a second given distance from the projection of the wall surface of said second pair of pole members, a first pair of rectangular coils positioned on said first pair of poles and having a width substantially equal to the distance between the said remaining two sides of said cavity and having a height less than said first given distance, and a second pair of rectangular coils positioned on said second pair of poles and having a width less than the distance between the top surfaces of said first pair of poles and having a height less than said first given distance, two sides of each of said coils being parallel to the plane of the sheets of said stator member.

DIRK ARIE van den BERG.

REFERENCES CITED

The following references are of record in the file of this patent:

UNITED STATES PATENTS

| Number | Name | Date |
|---|---|---|
| 562,179 | Germann et al. | June 16, 1896 |
| 1,074,338 | Ahlm | Sept. 30, 1913 |
| 2,278,139 | Puchy | Mar. 31, 1942 |